United States Patent [19]
Saito et al.

[11] Patent Number: 5,589,910
[45] Date of Patent: Dec. 31, 1996

[54] APPARATUS FOR MEASURING A DISTANCE

[75] Inventors: Tatsuo Saito; Shigenori Goto, both of Oomiya, Japan

[73] Assignee: Fuji Photo Optical Co., Ltd., Saitama-ken, Japan

[21] Appl. No.: 357,431

[22] Filed: Dec. 14, 1994

[30] Foreign Application Priority Data

| Dec. 15, 1993 | [JP] | Japan | 5-315431 |
| Dec. 15, 1993 | [JP] | Japan | 5-315441 |
| Dec. 15, 1993 | [JP] | Japan | 5-315458 |
| Dec. 15, 1993 | [JP] | Japan | 5-315461 |

[51] Int. Cl.$^6$ .................................................. G03B 13/36
[52] U.S. Cl. ............................................ 396/106; 396/97
[58] Field of Search ............................................ 354/403

[56] References Cited

U.S. PATENT DOCUMENTS

| 4,592,638 | 6/1986 | Kaneda et al. | 354/403 |
| 5,315,342 | 5/1994 | Cocca | 354/403 |

*Primary Examiner*—W. B. Perkey
*Attorney, Agent, or Firm*—Hickman Beyer & Weaver

[57] ABSTRACT

A distance measuring apparatus according to the present invention comprises two types of distance measuring units, which are a first distance measuring unit of the active method for receiving reflected light of measuring light returning from an object and performing distance measurement based on a focused position thereof, and a second distance measuring unit of the passive method for receiving the natural light reflected by the object through two optical systems and performing the distance measurement based on two optical images thus obtained. The apparatus further has a luminance determining unit for determining a luminance of the external field from a photometry result, and a distance selecting device for selecting and outputting either one of distance measurement results obtained by the first distance measuring unit and second distance measuring unit as a proper distance value, based on the luminance of the external field determined by the luminance determining unit. This distance selecting device may be so arranged that the luminance of external field obtained by the luminance determining unit is determined in two levels of high level and low level. Then it selects the distance measurement result of the first distance measuring unit when the luminance of external field is determined as a low level or selects the distance measurement result of the second distance measuring unit when the luminance of external field is determined as a high level.

10 Claims, 13 Drawing Sheets

Fig. 6
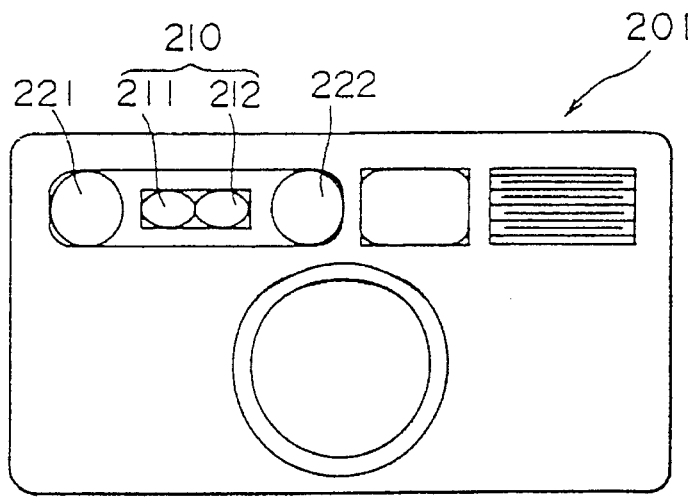
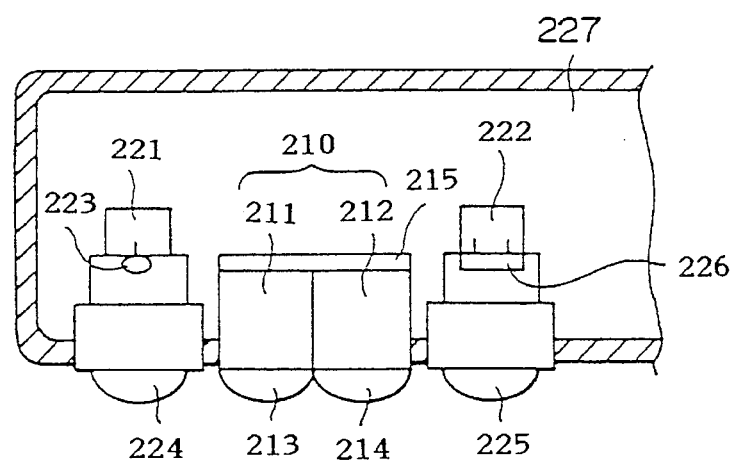
Fig. 7A
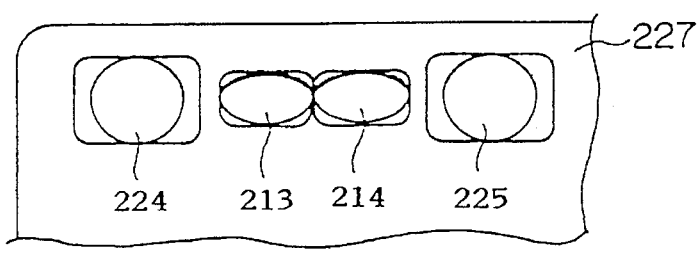
Fig. 7B
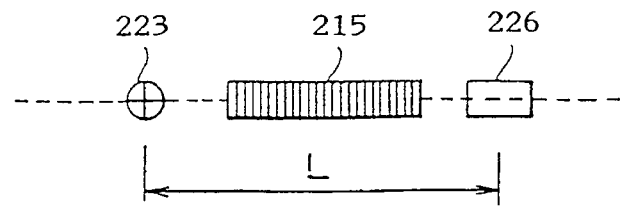
Fig. 7C

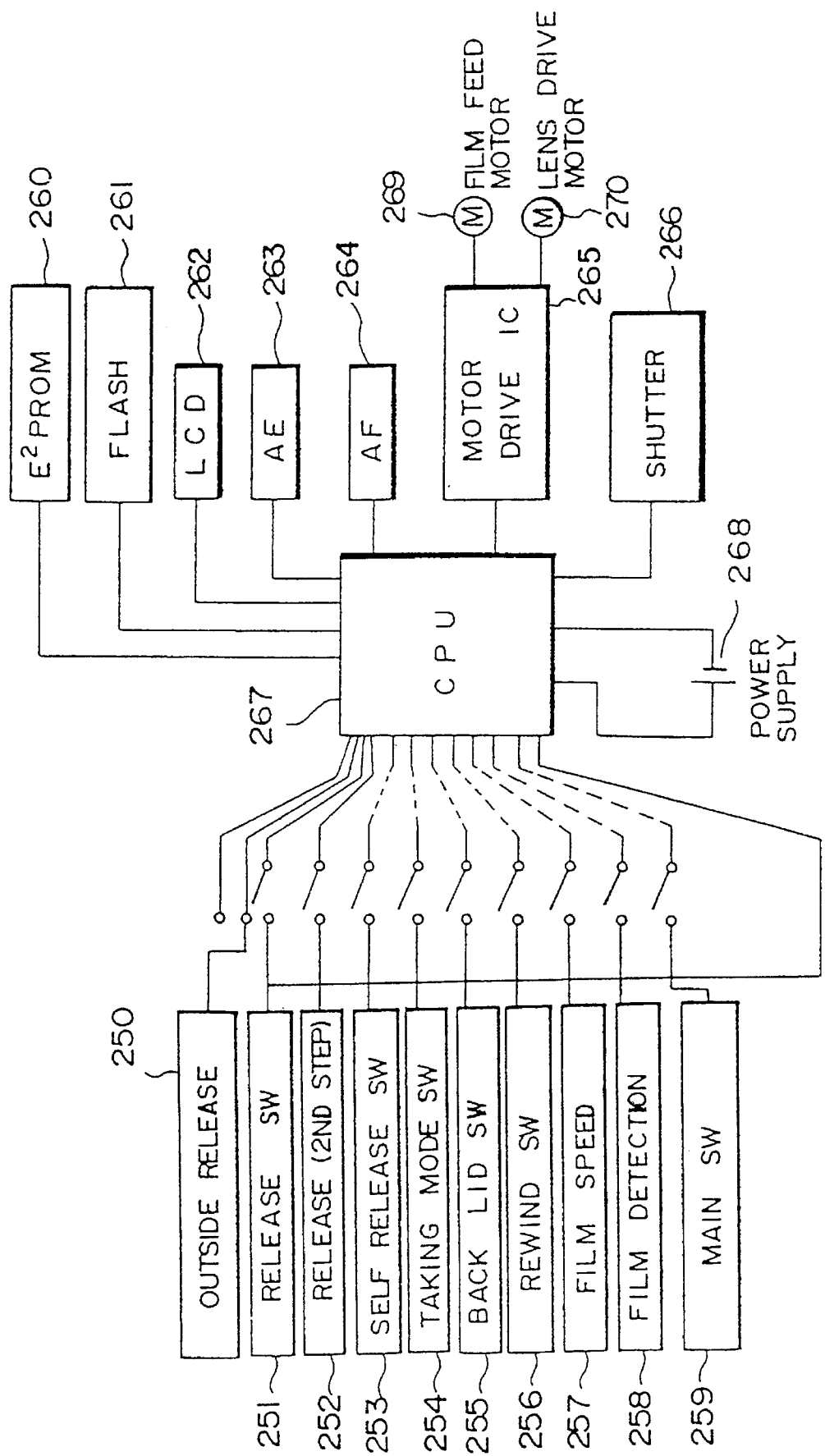

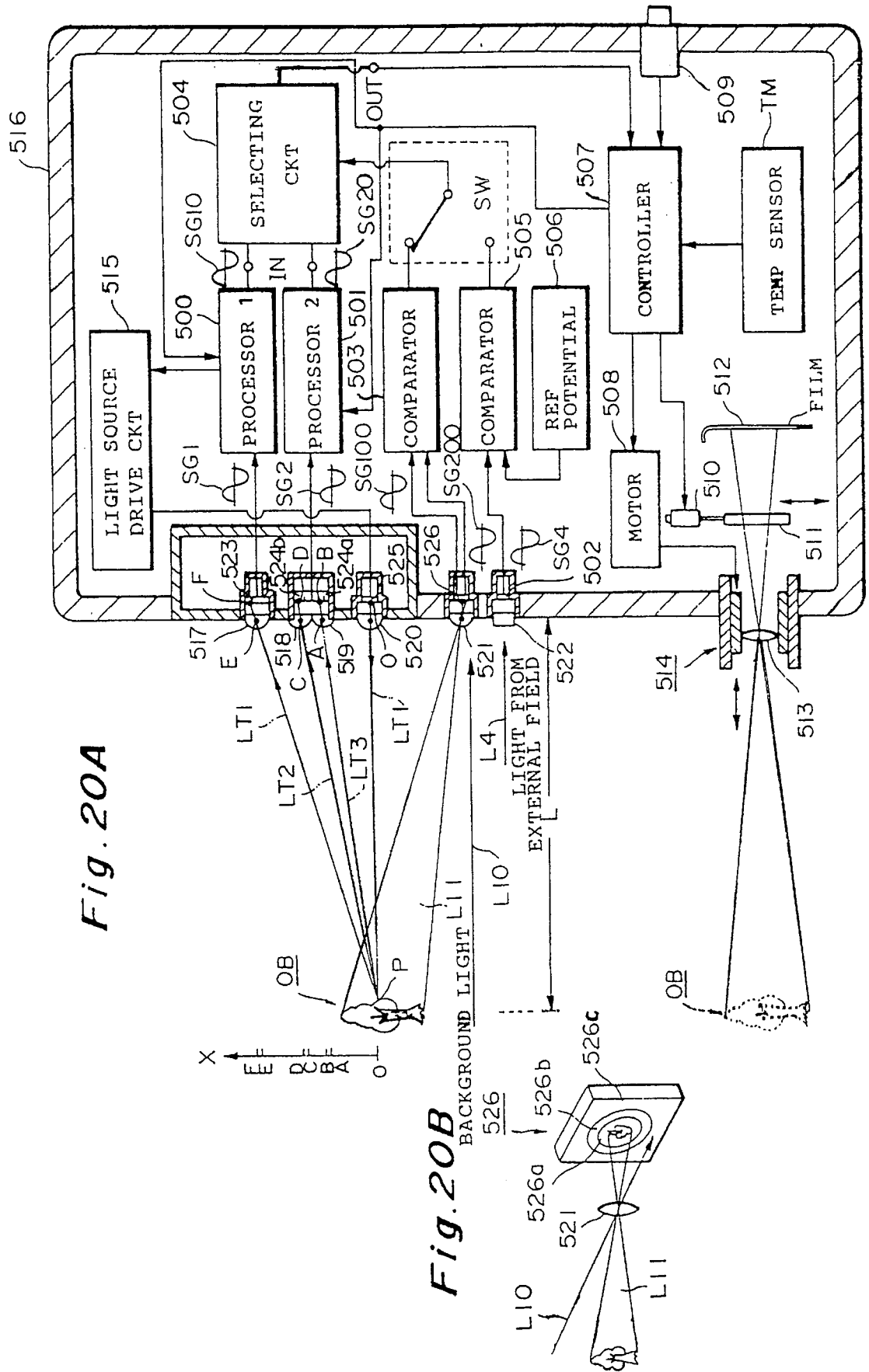

APPARATUS FOR MEASURING A DISTANCE

BACKGROUND OF THE INVENTION

1. Field of the Invention

The present invention relates to a distance measuring apparatus for camera which automatically measures a distance to an object.

2. Related Background Art

Conventional distance measuring apparatus for camera are described for example in Japanese Laid-open Patent Applications No. 4-184112 and No. 3-141311.

SUMMARY OF THE INVENTION

The present invention is directed to a distance measuring apparatus used in optical instruments such as cameras. The distance measuring apparatus is utilized particularly in an automatic focusing mechanism of camera.

This apparatus comprises:

(a) a first processing unit for calculating a distance to an object, based on an input signal;

(b) a second processing unit for calculating the distance to the object, based on an input signal;

(c) a first distance measuring unit of an active method for projecting first light toward the object in order to calculate the distance to the object by the first processing unit and detecting the first light reflected by the object to output a signal detected to the first processing unit;

(d) a second distance measuring unit of a passive method for detecting two light beams from the object, having passed through mutually different paths, in order to calculate the distance to the object by the second processing unit and outputting a signal detected to the second processing unit;

(e) a photodetector for detecting an intensity of light incident from surroundings into the apparatus;

(f) a comparator into which an output signal from the photodetector and a predetermined reference signal are put; and (g) a selection circuit into which a first output signal from the first processing unit and a second output signal from the second processing unit are put and which outputs the first output signal or the second output signal depending upon an output from the comparator.

The first distance measuring unit of the active method itself emits the first light toward the object. When it is very fine, it is difficult for the first distance measuring unit of the active method to precisely detect the first light.

On the other hand, the second distance measuring unit of the passive method itself does not emit light toward the object, thus being suitable for distance measurement in fine days. Use of the second distance measuring unit of the passive method is not suitable for distance measurement in the gloom or at dark places.

Then, the apparatus of the present invention is provided with the distance measuring unit of the active method and the distance measuring unit of the passive method. This apparatus can perform accurate distance measurements both in very fine days and cloudy days.

The photodetector (exposure meter) for example of CdS measures the intensity of light in surroundings. The selection circuit selects either the output from the distance measuring unit of the active method or the output from the distance measuring unit of the passive method in a switching manner to output the selected one. If the intensity of the light detected by the photodetector is higher than a predetermined value, the selection circuit outputs the output signal from the second distance measuring unit. If the intensity of the light detected by the photodetector is lower than the predetermined value, the selection circuit outputs the output signal from the first distance measuring unit.

Accordingly, a camera using this distance measuring apparatus can measure the distance to the object and can be focused on the object, regardless of the surrounding environment.

The apparatus of the present invention is next described referring to FIG. 20A and FIG. 20B. The apparatus of the present invention comprises:

(a) a first processing unit 500 for calculating a distance L to an object OB, based on an input signal SG1;

(b) a second processing unit 501 for calculating the distance L to the object OB, based on an input signal SG2;

(c) a first distance measuring unit (517, 523, 520, 525, 515) of the active method for projecting first light LT1 toward the object OB in order to calculate the distance L to the object OB by the first processing unit 500 and detecting the first light LT1 reflected by the object OB to output a signal detected to the first processing unit 500;

(d) a second distance measuring unit (524a, 524b, 518, 519) of the passive method for detecting two light beams (LT2, LT3) from the object OB, having passed through mutually different paths, in order to calculate the distance L to the object OB by the second processing unit 501 and outputting a signal detected to the second processing unit;

(e) a photodetector 502 for detecting an intensity of light LT4 incident from surroundings into the apparatus;

(f) a comparator 503 into which an output signal SG4 from the photodetector 502 is put; and (g) a selection circuit 504 into which a first output signal SG10 from the first processing unit 500 and a second output signal SG20 from the second processing unit 501 are put and which outputs the first output signal SG10 or the second output signal SG20 depending upon an output from the comparator 503.

This apparatus further comprises:

(h) a case 516 for housing the first and second processing units (500, 501);

(i) a lens 513 for taking the object OB;

(j) a lens moving mechanism 514 mounted to the case 516, for moving the lens 513 relative to the case 516;

(k) a motor 508 for driving the lens moving mechanism 514;

(l) a release button 509 set in the case 516; and (m) a controller 507 into which the first output signal SG10 or the second output signal SG20 from the selection circuit 504 is put when the release button 509 is depressed and which controls the motor 508 in accordance with the input signal to move the lens 513 to a position where an image of the object OB is focused on a film 512 set in the case 516.

Another apparatus of the present invention further comprises:

(h) a case 516 for housing the first and second processing units;

(i) a lens 513 for taking the object OB;

(j) a lens moving mechanism 514 mounted to the case 516, for moving the lens 513 relative to the case 516;

(k) a motor 508 for driving the lens moving mechanism 514;

(l) a release button 509 set in the case 516; and (m) a shutter mechanism 510, 511 set in the case 516; and (n) a controller 507 into which the first output signal SG10 or the second output signal SG20 from the selection circuit 504 is put when the release button 509 is depressed at a first time and which controls the motor 508 in accordance with the input signal SG10 or SG20 to move the lens 513 to a position where an image of the object OB is focused on the film 512 set in the case 516, said controller 507 controlling the shutter mechanism 510, 511 when the release button 509 is depressed at a second time after the first time.

In more detail, when the shutter 509 is depressed at the first time, the controller 507 starts the first distance measuring unit (517, 523, 520, 525, 515), the second distance measuring unit (524a, 524b, 518, 519), the first processing unit 500, and the second processing unit 501. The first processing unit outputs the first output signal SG10 having information on the distance to the object, which is put into the selection circuit 504. The second processing unit 501 outputs the second output signal SG20 having information on the distance to the object OB, which is put into the selection circuit 504. The photodetector 502 measures the intensity (exposure) of the light L4 from surroundings. The comparator 505 compares the output signal from the photodetector 502 with the reference potential 506 to output the result to the selection circuit 504. If the result is that the output signal is lower than the reference potential 506, the selection circuit 504 outputs the first output signal SG10 to the controller 507; if the result is that the output signal is higher than the reference potential 506, the selection circuit 504 outputs the second output signal SG20 to the controller 507.

When the first output signal SG10 or the second output signal SG20 is put into the controller 507, the controller 507 controls the motor 508. The motor 508 controls the lens moving mechanism 514. The moving mechanism 514 moves the lens relative to the case 516 in accordance with the first or second output signal put into the controller 507.

When the release button 509 is depressed at the second time, the controller 507 controls the shutter mechanism 510, 511 so as to form an image of the object OB on the film 512. The shutter moving mechanism 510, 511 comprises a shutter 511 and an actuator 510.

The first distance measuring unit comprises a light-emitting device 525 for emitting the first light and a first light-receiving device 523 for receiving the first light, while the second distance measuring unit comprises second light-receiving devices (524a, 524b) for receiving the two beams (LT2, LT3) from the object OB, having passed through mutually different paths.

The light-emitting device 525 is a light-emitting diode, the first light-receiving element 523 is a position-detecting semiconductor device (PSD), and the second light-receiving devices (524a, 524b) are charge-coupled devices.

The second light-receiving devices (524a, 524b) are located between the light-emitting device 525 and the first light-receiving device 523.

Another apparatus of the present invention comprises:

(a) a first processing unit 500 for calculating a distance L to an object OB, based on an input signal SG1;

(b) a second processing unit 501 for calculating the distance L to the object OB, based on an input signal SG2;

(c) a first distance measuring unit (517, 523, 520, 525, 515) of the active method for projecting first light LT1 toward the object OB in order to calculate the distance L to the object OB by the first processing unit 500 and detecting the first light LT1 reflected by the object OB to output a signal SG1 detected to the first processing unit 500;

(d) a second distance measuring unit (524a, 524b, 518, 519) of the passive method for detecting two light beams (LT2, LT3) from the object OB, having passed through mutually different paths, in order to calculate the distance L to the object OB by the second processing unit 501 and outputting a signal SG2 detected to the second processing unit 501;

(e) a semiconductor photodetector 526 having a first photodetecting area 526a, a second photodetecting area 526c surrounding the first photodetecting area 526a, and an insulator 526b located between the first photodetecting area 526a and the second photodetecting area 526c;

(f) a lens 521 arranged so that light L11 from the object OB is incident to the first photodetecting area 526a and so that light L10 from surroundings of the object OB is incident to the second photodetecting area 526c;

(g) a comparator 503 into which an output signal SG100 from the first photodetecting area 526a and an output signal SG200 from the second photodetecting area 526c are put; and (h) a selection circuit into which the first output signal SG10 from the first processing unit 500 and the second output signal SG20 from the second processing unit 501 are put and which outputs the first output signal SG10 or the second output signal SG20 depending upon an output from the comparator 503.

This apparatus is so arranged that when the output SG200 from the second photodetecting area 526c is larger than the output SG100 from the first photodetor 526a, the selection circuit 504 outputs the second output signal SG20, and that when the output SG200 from the second photodetecting area 526c is smaller than the output SG100 from the first photodetor 526a, the selection circuit 504 outputs the first output signal SG10. Namely, the apparatus uses the first distance measuring unit of the passive method when the intensity of the background light L10 is higher than the intensity of the light from the object OB upon shooting (in the case of back-light), but uses the second distance measuring unit of the active method when the intensity of the background light L10 is lower than the intensity of the light from the object OB.

A camera provided with the distance measuring apparatus comprises:

(a) an active distance measuring apparatus (517, 523, 520, 525, 500, 515) having a light projecting portion (525, 515) for emitting light LT1 toward an object OB and a light-receiving portion 523 for receiving the light LT1 reflected by the object OB, said active distance measuring apparatus measuring a distance to the object OB by the principle of trigonometry based on a position F of the reflected light LT1 in the light-receiving portion 523;

(b) a passive distance measuring apparatus (524a, 524b, 518, 519, 501) having two light-receiving portions (524a, 524b) for receiving light beams (LT3, LT2) from the object OB, said passive distance measuring apparatus measuring the distance L to the object OB by the principle of trigonometry based on a phase difference between output signals SG2 from the light-receiving portions (524a, 524b); and (c) a selection apparatus 504 for letting the active distance measuring apparatus perform at least one distance measurement, selecting a value of distance measurement of the active distance measuring apparatus as a distance used in shooting if the value of the distance measurement is smaller than a predetermined value, and selecting a value of distance measurement of the passive distance measuring apparatus as a distance used in shooting if it is larger than the predetermined value.

Using the first distance measuring apparatus, the distance L is obtained from the distance F between a point 0 and a point F on the X axis, a focal length f of lens 517, and a distance ef between a point E and the point F on the X axis. Here, the distance L is obtained from the relation of (L+f):F=f:ef.

Using the second distance measuring apparatus, the distance L is obtained from the focal length f of lens 518 and lens 519, a distance ab between a point A and a point B on the X axis, a distance cd between a point C and a point D on the X axis, a distance B between the point 0 and the point B on the X axis, a distance D between the point 0 and the point D on the X axis, and a distance ac between the point A and the point C. Here, the distance L is obtained from the relations of (L+f):B=f:ab, (L+f):D=f:cd, and D=B−ab+ac cd. The points O, A, C, E are center points of optical axes of the lenses 520, 519, 518, 517. The principle of trigonometry is described for example in Japanese Laid-open Patent Applications No. 4-184112 and No. 3-141311.

A temperature sensor TM is mounted in the apparatus. Reference numeral 522 designates a glass plate, 515 a light source driving circuit, 512 a film, 513 a lens, 511 a shutter, 510 a shutter mechanism, and 506 a reference potential.

BRIEF DESCRIPTION OF THE DRAWINGS

FIG. 6 is a front elevation of a camera provided with the distance measuring apparatus according to the present embodiment;

FIG. 7A is a top plan view to show only a passive light-receiving portion, an active light-projecting porkion, and an active light-receiving portion as extracted, FIG. 7B a front elevation thereof, and FIG. 7C a front elevation to show a light-projecting device and light-receiving devices set inside;

FIG. 8 is a block diagram to schematically show structure of the inside of the camera;

FIG. 20A and FIG. 20B are drawings to illustrate the apparatus of the present invention.

DESCRIPTION OF THE PREFERRED EMBODIMENTS

Figure 1:
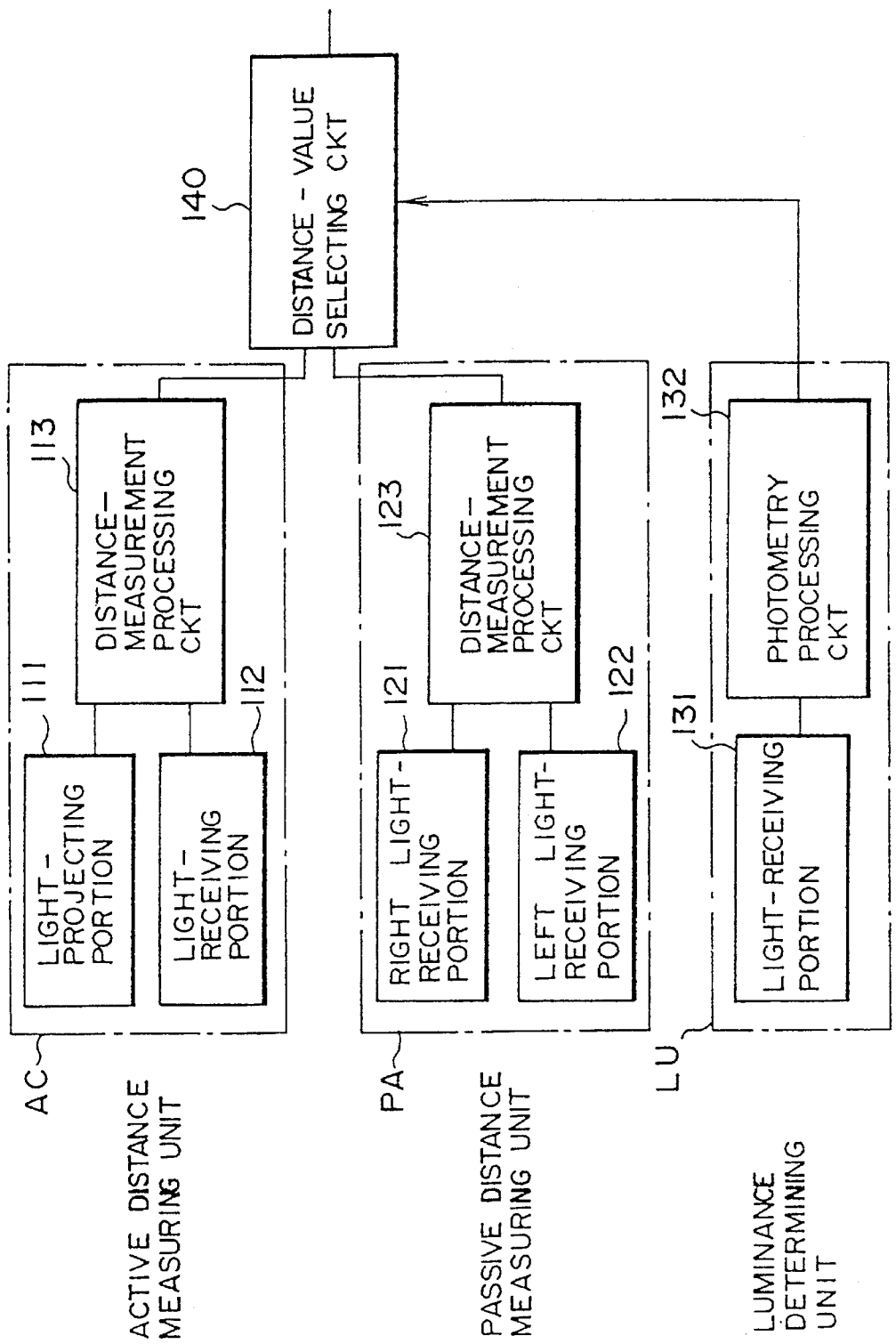
FIG. 1 is a block diagram to schematically show structure of a distance measuring apparatus according to the present embodiment.

A distance measuring apparatus of camera of the active method using the principle of trigonometry has a light source for distance measurement such as LED and measures the distance to an object in combination with a light-receiving device.

As a distance measuring apparatus of another method, another distance measuring apparatus of camera of the passive method using the principle of trigonometry, receives the natural light reflected by the object through two optical systems and measures the distance to the object by a phase difference etc. between two optical images obtained by the respective optical systems.

The distance measuring apparatus of the active method receives the measuring light returning from the object to measure the distance to the object, as described. However, if the luminance of the external field is too high, the light-receiving device fails to receive the reflected light of the measuring light in a good state, which would result in lowering the accuracy of distance measurement and which would disable the distance measurement depending upon the luminance of the external field. On the other hand, if the luminance of the external field is too low in the case of the passive method distance measuring apparatus, a quantity of reflected light of the natural light from the object naturally becomes too low to detect the phase difference, which would lower the accuracy of distance measurement and which would disable the distance measurement.

The present invention has been accomplished to solve the above problems, and an object of the invention is to provide a distance measuring apparatus which has a wide application range for the luminance of the external field and which can always perform high-accuracy distance measurement.

A distance measuring apparatus according to the present invention comprises two types of distance measuring units, a first distance measuring unit of the active method for receiving reflected light of measuring light returning from an object to perform distance measurement based on a focused position thereof, and a second distance measuring unit of the passive method for receiving the natural light reflected by the object through two optical systems to perform distance measurement based on two optical images thus obtained. Further, the apparatus has a luminance determining unit for determining the luminance of the external field from a photometry result, and distance selecting means for selecting and outputting either one of the distance measurement results obtained by the first distance measuring unit and the second distance measuring unit as a proper distance value, based on the luminance of the external field determined by the determining unit.

The distance selecting means may be so arranged that the luminance of the external field obtained by the luminance determining unit is discriminated between two levels of high level and low level. Then, a possible arrangement is such that when the luminance of external field is determined as being in the low level, the distance measurement result of the first distance measuring unit is selected; or such that when the luminance of external field is determined as being in the high level, the distance measurement result of the second distance measuring unit is selected.

The distance selecting means may be so arranged that the luminance of the external field obtained by the luminance determining unit is discriminated among three levels of high level, intermediate level, and low level. Then, a possible arrangement is such that when the luminance of the external field is determined as being in the low level, the distance measurement result of the first distance measuring unit is selected; such that when the luminance of the external field is determined as being in the high level, the distance measurement result of the second distance measuring unit is selected; or such that when the luminance of the external field is determined as being in the intermediate level, either one of the distance measuring results obtained by the first distance measuring unit and the second distance measuring unit is selected as a proper distance value, based on a value of a predetermined parameter obtained by measurement.

The distance measuring apparatus according to the present invention is provided with the two types of distance measuring units, the first distance unit of the active method and the second distance measuring unit of the passive method, and performs the distance measurement using the two units. The luminance determining unit obtains the luminance of the external field and, based on the result, the distance selecting means selects either one of the distance measurement results as a proper distance value. Namely, when the luminance of the external field is determined as being relatively high, the light-receiving device for receiving the measuring light in the active method unit does not function well, while reliability of the distance value by the passive method unit is high enough because of an increase in light quantity of the natural light reflected by the object. Therefore, the distance measurement result of the second distance measurement unit of the passive method is selected. Conversely, when the luminance of the external field is determined as being relatively low, the reliability of the passive method unit is low because the quantity of reflected light of the natural light is small, while the reliability of distance value by the active method unit is high enough because the light-receiving portion can detect the reflected light of the measuring light well. Therefore, the distance measurement result of the first distance measuring unit of the active method is selected in this case.

FIG. 1 shows schematic structure of the distance measurement apparatus according to the present embodiment. This distance measuring apparatus has an active distance measuring unit AC for performing distance measurement of the active method of the trigonometry type and a passive distance measuring unit PA for performing distance measurement of the passive method of the trigonometry type, and further has a luminance determining unit LU for determining the luminance of the external field, and a distance-value selecting circuit 140.

The active distance measuring unit AC has a light-projecting portion 111 constructed of LED etc., for projecting the measuring light toward the object and a light-receiving portion 112 (FIG. 3) constructed of PSD etc., for receiving reflected light thereof, and further has a distance-measurement circuit 113 for calculating the distance to the object, based on a result of projection and reception of light.

The passive distance measuring unit PA has a right light-receiving portion 121 and a left light-receiving portion 122 (FIG. 3) for receiving reflected light of the natural light from the object through two optical systems, and further has CCD (photo position detector not shown) for receiving two optical images obtained through the light-receiving portions, and a distance-measurement circuit 123 for calculating the distance to the object, based on the result.

The luminance determining unit LU has a light-receiving device for controlling exposure, for example a light-receiving portion 131 formed of CdS, and a photometry processing circuit 132 for calculating the luminance of the external field, based on a result of light reception thereof.

The distance-value selecting circuit 140 is a circuit for selecting and outputting one of distance values measured by the respective distance measuring units AC, PA, according to the luminance of the external field obtained by the luminance determining unit LU.

Figure 3:
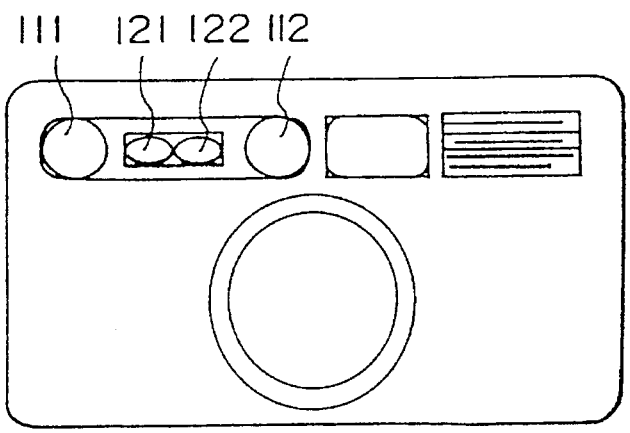
FIG. 3 is a front elevation to show a camera provided with the distance measuring apparatus according to the present embodiment.
Figure 4:
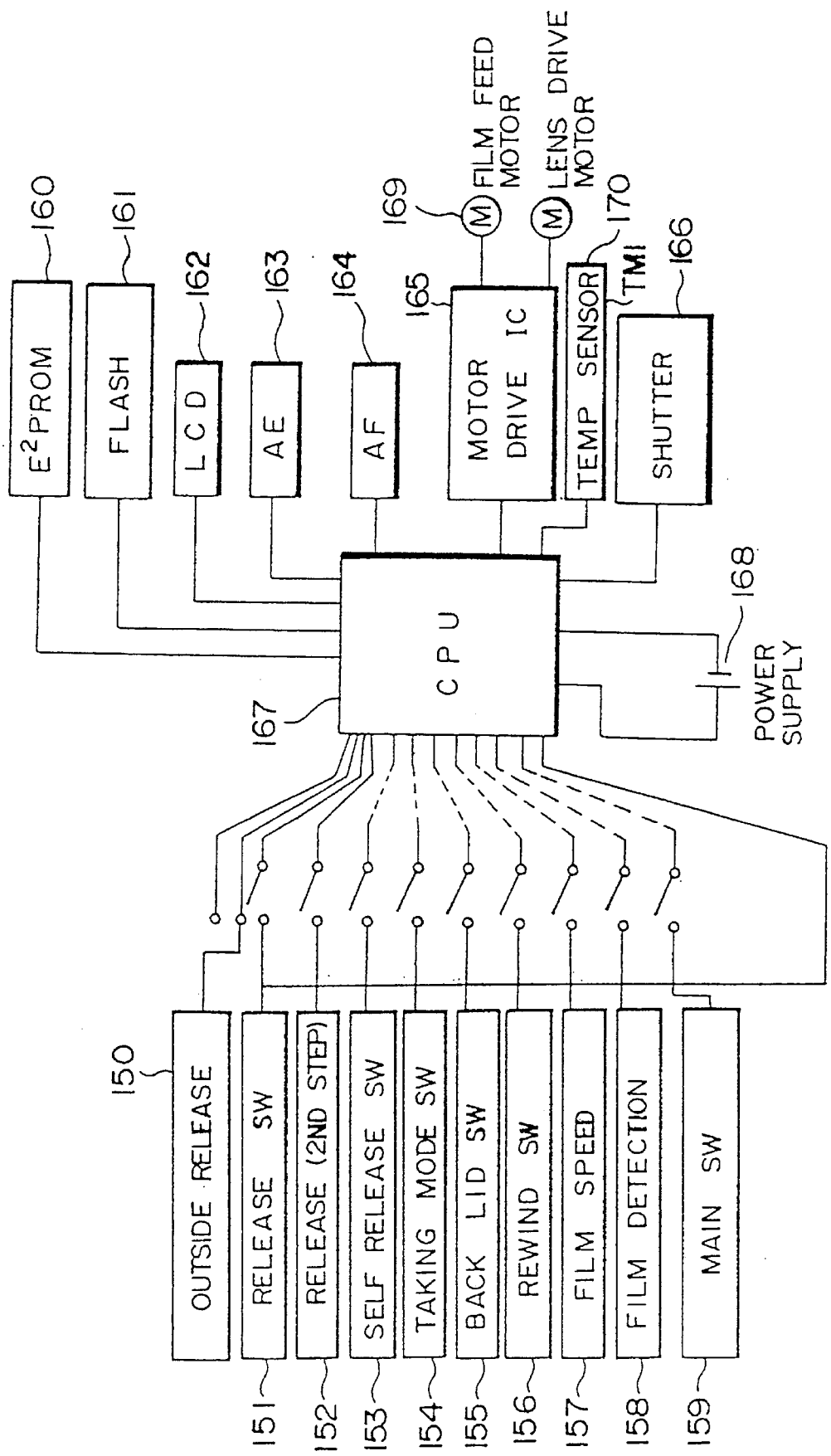
FIG. 4 is a block diagram to schematically show structure of the inside of the camera.

FIG. 3 shows an appearance of a camera provided with the distance measuring apparatus according to the present embodiment, and FIG. 4 the scheme of the internal mechanism thereof. The distance-measurement circuits 113, 123, photometry processing circuit 132, and distance-value selecting circuit 140 shown in FIG. 1 are built in CPU 167 shown in FIG. 4. Electrically connected to CPU 167 are an outside release button 150, a first release switte 151, a second release switch 152, a self release switte 153, a taking mode switch 154, a back-lid switch 155, a rewinding switch 156, a film speed switch 157, a film detection switch 258, and a main switch 159. Further electrically connected to CPU 167 are EEPROM 160, a flash device 161, LCD (liquid crystal color display) 162, AE (automatic exposure system) 163, AF (autofocusing system) 164, a motor drive IC 165, a shutter 166, and a power source 168. A film feed motor 169 and a lens drive motor 170 are electrically connected to the motor drive IC 165.

Figure 5:
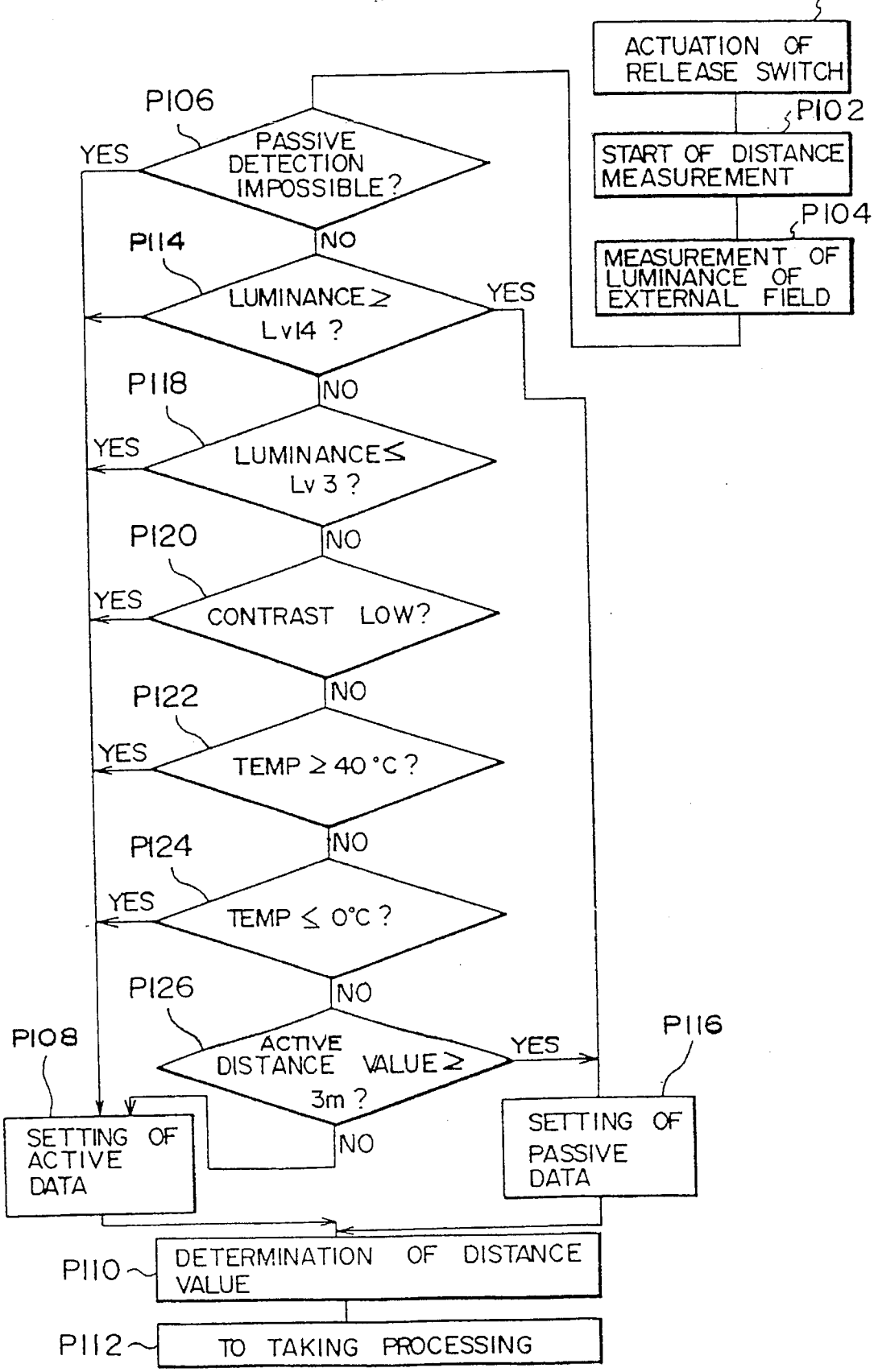
FIG. 5 is a flowchart to show the operation of the distance measuring apparatus of the present embodiment.

Now, the operation of the distance measuring apparatus is described referring to FIG. 5.

First, when the release switch 150 or 151 is turned on (P100), the active distance measuring unit AC and passive distance measuring unit PA both start measuring the distance (P102). At the same time with or almost simultaneously with this processing, the luminance determining unit LU measures the luminance of the external field (P104). Then the distance-value selecting circuit 140 first determines whether or not the passive distance measuring unit PA can measure the distance (P106). This is because the passive distance measurement depends upon a pattern of object. For example, if an object is repetition of vertical stripe patterns or a surface with uniform luminance, calculation of distance based on the passive distance measurement becomes impossible. If the process at P106 finds incapability of detection, a distance value of the active distance measuring unit AC is immediately selected to be output from the distance-value selecting circuit 140 (P108, P110). Taking processes hereinafter are executed based on this distance value.

On the other hand, if the passive distance measuring unit PA can measure the distance (or if the answer is "NO" at P106), it is determined whether or not the luminance of the external field obtained by the luminance determining unit LU is in a high luminance level of not less than Lv14 (P114). If the luminance of external field is too high, the light-receiving portion 112 in the active method would fail to receive the reflected light of the measuring light in a good condition, thereby possibly lowering the accuracy of distance measurement. In contrast, the passive method can keep high reliability of the distance value measured because of an increase in light quantity of the natural light reflected by the object. Thus, if the luminance of external field obtained by the luminance determining unit LU is not less than Lv14, the distance-value selecting circuit 140 immediately selects the distance value of the passive distance measuring unit PA (P116, P110). Taking processes hereinafter are executed based on this distance value output from the distance-value selecting circuit 140 (P112).

If the luminance of external field is less than Lv14 (or if the answer is "NO" at P114), it is determined whether or not the luminance of external field is in a low luminance level of not more than Lv3 (P11S). If the luminance of external field is too low, the reliability of the passive method is not so high because of a reduced quantity of reflected light of the natural light; whereas, the reliability of the distance value measured by the active method is high enough because the reflected light of the measuring light can be detected well. Therefore, if the luminance of external field obtained by the luminance determining unit LU is not more than Lv3 (or if the answer is "YES" at P118), the distance-value selecting circuit 140 immediately selects the distance value of the active distance measuring unit AC to output it (P108, P110).

As described, where the luminance of external field is of a high luminance level of not less than Lv14 or of a low luminance level of not more than Lv3, the distance-value selecting circuit 140 immediately selects one of the distance values; where the luminance level is of an intermediate luminance level of 3<Lv<14, it selects either one, based on values of the following parameters.

First, the distance-value selecting circuit 140 determines whether or not the contrast is low (P120). After it was determined at P106 that the passive distance measuring unit PA could measure the distance and if that the contrast is low is determined from sensor data of AE (automatic exposure; FIG. 4) including the luminance determining unit LU (or if the answer is "YES" at P120), the distance-value selecting circuit 140 immediately selects the distance value of the active distance measuring unit AC (P108). This is because the results of distance measurement depend upon the contrast of object in the case of the distance measurement by the passive method, sometimes resulting in lowering the accuracy of distance measurement or disabling the distance measurement for objects of uniform luminance (low contrast). Conversely, the distance measurement by the active method is free from such a defect even if the object is of a low contrast. Accordingly, the distance-value selecting circuit 140 is set to select the more reliable distance value of the active distance measuring unit AC for low contrast cases.

Unless the object is of a low contrast (or if the answer is "NO" at P120), next determination is carried out based on the temperature. Namely, it is determined whether the temperature is a high temperature over 40° C. inclusive (P122) or whether the temperature is a low temperature below 0° C. inclusive (P124). This is because components constituting the internal optical system inside the camera thermally expand or contract depending upon the temperature. This thermal expansion or contraction changes an optical path length from a light-emitting body to a light-receiving body. The optical path length of the passive distance measuring unit PA is much shorter than that of the active distance measuring unit AC. Thus, if the temperature is too low or too high, errors in the results of distance measurement of the passive distance measuring unit PA become extremely large. If either P122 or P124 is affirmed, then the distance-value selecting circuit 740 immediately selects the result of distance measurement of the active distance measuring unit AC (P108). The temperature is detected by the temperature sensor TM1 electrically connected to the controller 267.

If neither P122 nor P124 is affirmed (or if the answer is "NO" at P122 and P124), the distance-value selecting circuit 140 determines whether or not the distance measured by the active distance measuring unit AC is longer than 3 m (P126). The reason of this determination is as follows. Since the active method is a method in which the measuring light is projected toward the object and reflected light thereof is received, there is a limit on a projection distance of the measuring light. If the distance to the object were too far, the reflected light would be insufficient, sometimes resulting in lowering the accuracy of distance measurement or disabling the distance measurement. Thus, if the result of distance measurement by the active distance measuring unit AC shows that the object is farther than 3 m (or if the answer is "YES" at P126) the distance-value selecting circuit 140 selects the distance value of the passive distance measuring unit PA (P116); if the object is closer than 3 m (or if the answer is "NO" at P126) the distance-value selecting circuit 140 selects the result of distance measurement by the active distance measuring unit AC (P108).

As described above, either one of the distance values is finally selected and the taking processes are executed based on the distance value thus selected by the distance-value selecting circuit 140.

As described above, the distance measuring apparatus according to the present embodiment is so arranged that out of the distance values obtained by the active distance measuring unit AC and the passing distance measuring unit PA, respectively, a more reliable one is selected as a proper distance value, depending upon the luminance of the external field etc.

The above-described embodiment showed an example in which the luminance of the external field was determined in the three ranges, the high luminance level of not less than Lv14, the low luminance level of not more than Lv3, and the intermediate luminance level of 3<Lv<14, but besides, the luminance of external field can be determined in two ranges, the high luminance level and low luminance level. In that case a luminance level as reference is preferably a value of about Lv12. In more detail, the distance measurement result of the passive distance measuring unit PA is selected as a proper distance value if the luminance of external field is not less than Lv12; the distance measurement result of the active distance measuring unit AC is selected as a proper distance value if the luminance of external field is less than Lv12. It should be noted that these luminance levels are just examples of most preferable values and that other values are of course applicable in the present invention.

Figure 2:
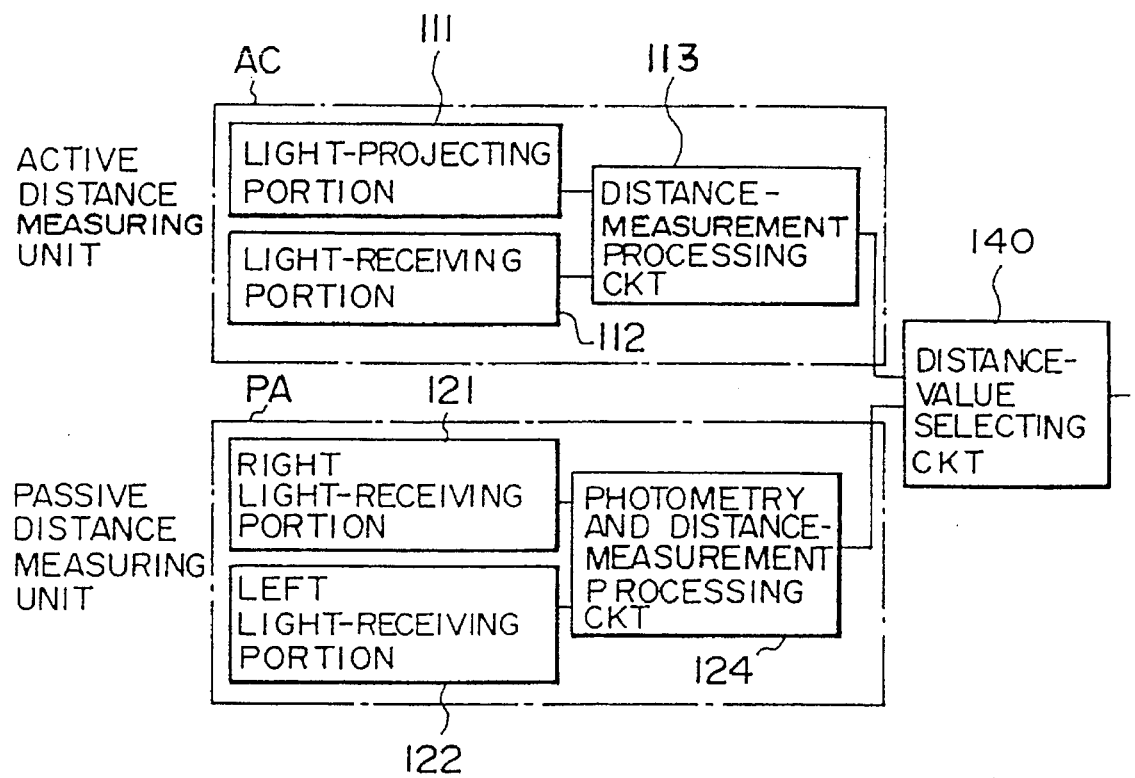
FIG. 2 is a block diagram of a distance measuring apparatus.

In the present embodiment the luminance determining unit LU can utilize the structure of AE (automatic exposure) unit in FIG. 4, but besides, the luminance determining unit may be a light-receiving portion and a photometry processing circuit provided separately from the AE unit, or, as shown in FIG. 2, the luminance of the external field can be attained by a photometry and distance-measurement processing circuit 124, based on results of light reception of respective light-receiving portions 121, 122 in the passive distance measuring unit PA.

This distance measuring apparatus is provided with the first distance measuring unit of the active method and the second distance measuring unit of the passive method, wherein the luminance determining unit and distance selecting means are used to select either one of the distance values as a proper one depending upon the luminance of external field. Accordingly, the present invention can provide the distance measuring apparatus which has a wide application range for the luminance of external field and which can always perform the distance measurement with high accuracy.

A distance measuring apparatus as will be explained using FIG. 6 to FIG. 8 has a passive light-receiving portion for receiving the natural light reflected by the object through two optical systems, an active light-projecting portion for projecting the measuring light toward the object, and an active light-receiving portion for receiving reflected light of the measuring light reflected by the object. The passive light-receiving portion is located at the center, the active light-projecting portion on one side thereof, and the active light-receiving portion on the side opposite thereto.

It is preferred that the center portions of these passive light-receiving portion, active light-projecting portion, and active light-receiving portion be set on a straight line.

Such a camera is provided with the two types of distance measuring units, i.e., the passive light-receiving portion for distance measurement by the passive method, and the active light-projecting portion and active light-receiving portion for distance measurement by the active method, as being arranged for example in such structure that depending upon the luminance of the external field, the distance value of either method is selected or the distance measurement is carried out by either one of the methods.

Since the passive light-receiving portion is located at the center and the active light-projecting portion and active light-receiving portion are set on either side thereof as described above, the base length is secured between the active light-projecting portion and the active light-receiving portion, and the passive light-receiving portion is set in clearance for securing the base length, whereby the limited space can be effectively utilized.

Further, where the passive light-receiving portion and the active light-projecting portion and active light-receiving portion are set on a same straight line, deviation of measuring field between the two methods can be minimized.

FIG. 6 shows an appearance of the camera. This camera 201 is provided with the passive distance measuring unit for performing the distance measurement of the passive method of the trigonometry type, and the active distance measuring unit for performing the distance measurement of the active method also of the trigonometry type. Reference numeral 210 designates the passive light-receiving portion for passive distance measurement, and reference numerals 221, 222 the active light-projecting portion and active light-receiving portion for active distance measurement.

FIG. 7A–FIG. 7C show only these passive light-receiving portion 210, the active light projecting portion 221 and active light-receiving portion 222 as extracted. FIG. 7A is a top plan view of the light-projecting and light-receiving portions, FIG. 7B a front elevation thereof, and FIG. 7C a drawing to show a light-projecting device and light-receiving devices set inside the light-projecting and light-receiving portions.

The passive light-receiving portion 210 is provided at the left top corner of the front elevation of camera 201, and has a right light-receiving portion 211 and a left light-receiving portion 212 for receiving the natural light reflected by the object through two optical systems. The natural light reflected by the object and the background reaches light-receiving lenses 213, 214 set on the respective front surfaces of the right light-receiving portion 211 and left light-receiving portion 212 to be focused on CCD 215 set inside the right light-receiving portion 211 and left light-receiving portion 212. Then the distance to the object is obtained from a phase difference between two optical images focused on CCD 215.

The active light-projecting portion 221 and active light-receiving portion 222 are located on either side of the passive light-receiving portion 210. LED 223 is set in the active light-projecting portion 221, and light emitted from LED 223 travels through a projection lens 224 to be projected as the measuring light toward the object (not shown). The measuring light reflected by the object reaches a receiving lens 225 set on the front surface of the active light-receiving portion 222 to be focused on PSD 226 as a light-receiving device set in the light-receiving portion 222. The PSD 226 outputs electric currents divided depending upon the focused position, and the distance to the object is calculated from the current outputs. In such an active distance measurement method a sufficient base length L needs to be secured in order to maintain the accuracy of trigonometry between the active light-projecting portion 221 and active light-receiving portion 222. Thus, there is clearance given between the light-projecting portion 221 and light-receiving portion 222. Then the passive light-receiving portion 210 is set in the clearance for securing the base length L.

In addition, as shown in FIG. 7C, the centers of these passive light-receiving portion 210, active light-projecting portion 221, and active light-receiving portion 222 are arranged to be positioned on a straight line T shown by the dotted line. Arranging the centers of the portions on the same straight line T as described, there is such an effect that deviation of measuring field between the two methods can be minimized.

The distance measurement result of either method is processed inside CPU built in the camera (FIG. 8) to obtain the distance to the object. Electrically connected to CPU 267 are an outside release button 250, a first release switch 251, a second release switch 252, a self release switch 253, a taking mode switch 254, a back-lid switch 255, a rewinding switch 256, a film speed switch 257, a film detection switch 258, and a main switch 259. Further electrically connected to CPU 267 are EEPROM 260, a flash device 261, LCD (liquid crystal color display) 262, AE 263, AF 264, a motor drive IC 265, a shutter 266, and a power source 268. A film feed motor 269 and a lens drive motor 270 are electrically connected to the motor drive IC 265.

Where one camera includes both the active method distance measuring apparatus and the passive method distance measuring apparatus as described, the camera can be arranged for example in such structure that the distance measurement is carried out by either one of the methods depending upon the luminance of external field or another parameter, or that while executing the distance measurements by the both methods, one of the distance measurement results is selected depending upon the luminance of external field or another parameter.

In the camera provided with the distance measuring apparatus according to the present invention the passive light-receiving portion is located at the center while the active light-projecting portion on one side thereof and the active light-receiving portion on the opposite side. Accordingly, the present invention can provide the camera with the distance measuring apparatus which has a wide application range for the luminance of external field. Additionally, a sufficient base length can be secured between the light-projecting portion and the light-receiving portion in the active method and the whole of these light-projecting and light-receiving portions can be combined in a compact size. Also, the limited space can be effectively utilized without negatively affecting the accuracy of distance measurement for each method, thus contributing to miniaturization of the entire camera. Further, employing such an arrangement, the whole of these light-projecting and light-receiving portions are handled as one unit, which facilitates inspection of the unit itself or assembling of the unit in the camera. Furthermore, CPU is normally arranged to execute the controls, so that routing of signal lines becomes easier from the respective light-receiving and light-projecting portions to CPU.

By the arrangement that the center portions of these light-projecting and light-receiving portions are set on the same straight line, deviation of measuring field can be minimized between the passive method and the active method, in turn giving an advantage that deviation from an indication of measuring area provided in a finder can be reduced.

An apparatus described with FIG. 9 to FIG. 14 also utilizes the distance measuring unit of the active method and the distance measuring unit of the passive method.

In the active distance measuring method signal light is emitted from the light-projecting portion having a light-projecting device such as LED through a projection lens toward the object and the signal light reflected by the object is received through a receiving lens by PSD etc. provided in the light-receiving portion. PSD has a single receiving surface and outputs two current signals $I_1$, $I_2$ depending upon where the signal light from the object impinges in the receiving surface of PSD. The position where the signal light impinges is a function of $(I_1-I_2)/(I_1+I_2)$. Then the distance to the object is measured by the so-called principle of trigonometry based on the found position of the signal light.

On the other hand, in the case of the passive distance measurement method, the natural light reflected by the object is received by two light-receiving portions having respective light-receiving devices such as CCDs as arranged as two systems. CCD is a pixel type light-receiving device having a plurality of light-receiving surfaces or pixels each for outputting a single analog signal, and an output from CCD is an array of a plurality of analog signals. Taking a phase difference between two analog signal arrays as outputs from the two CCDs, the distance to the object is measured by the principle of trigonometry.

A method for obtaining the distance to the object based on the phase difference is described for example in Japanese Laid-open Patent Application No. 3-141311.

Since the above active distance measurement method measures the distance to the object, based on the signal light reflected by the object, detection of the signal light becomes difficult in the case of back-light, that is, where light such as sun light comes into the taking lens from behind the object to be taken. Namely, a signal from a single light-receiving surface in PSD becomes saturated by a lot of light from the sun or the like in the case of back-light, which disables detection of a less quantity of signal light as compared with the lot of light.

Conversely, when the luminance of the external field is low, for example in shooting in the evening, detection of the signal light reflected by the object becomes easier, so that measurement of distance to the object can be made with high accuracy.

On the other hand, in the case of the passive distance measurement method, because CCD has a plurality of light-receiving surfaces, it is rare even in the case of back-light or the like that all surfaces become saturated.

Conversely, if the luminance of the external field is low, a quantity of the natural light reflected by the object is as low as below the measurement level of CCD, not permitting use of the passive distance measurement method.

Then, this camera enables the distance measurement of object by using the passive distance measurement in back-light situations.

This camera is provided with a first distance measuring unit having a light-receiving device with a single light-receiving surface and measuring the distance to the object, a second distance measuring unit having a pixel type light-receiving device with a plurality of light-receiving surfaces and measuring the distance to the object, a photometry device for measuring luminances of the object and the background, a back-light determining device for determining whether or not the taking light is back-light, and a selecting device for selecting an output from the second distance measuring unit as a distance value used in shooting when the back-light determining device determines that the taking light is back-light.

It is preferred that the photometry device be a photodiode a light-receiving surface of which is divided into a central area and a peripheral area surrounding it, that the light-receiving device with a single light-receiving surface be PSD, and that the pixel type light-receiving device with a plurality of light-receiving surfaces be CCD.

In the present invention the photometry device measures the luminances of the object and the background and the back-light determining device determines that the taking light is back-light if the luminance of the background is higher than that of the object and if a difference between them is not less than a predetermined value. The passive distance measurement by the second distance measuring unit is carried out with the determination of back-light.

Since the second distance measuring unit of the passive method has the pixel type light-receiving device with a plurality of light-receiving surfaces, it is rare that all outputs of the light-receiving surfaces become saturated even in back-light cases. Therefore, the distance to the object can be measured even if the taking light is back-light.

Figure 9:
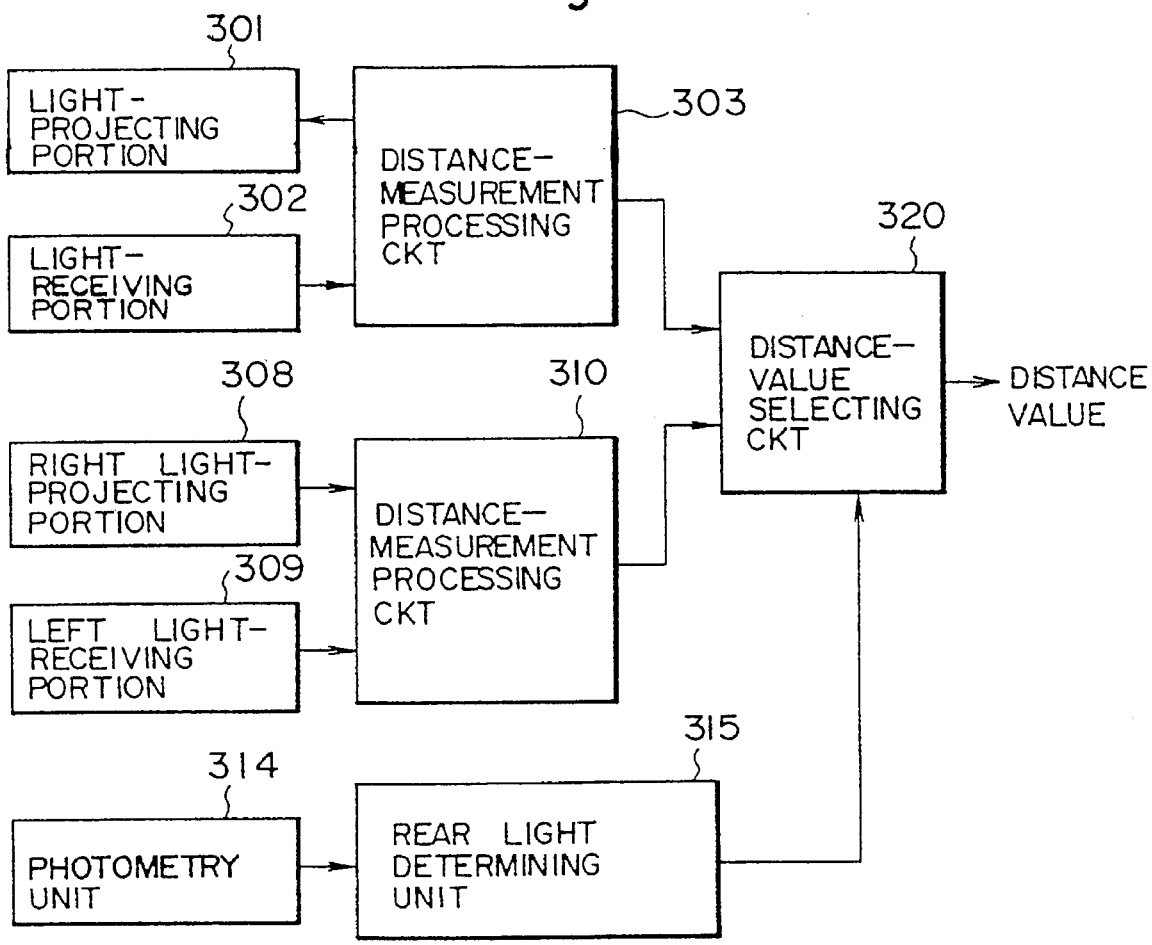
FIG. 9 is a block diagram to show structure of a distance measuring apparatus of camera constructed according to the present invention.
Figure 10:
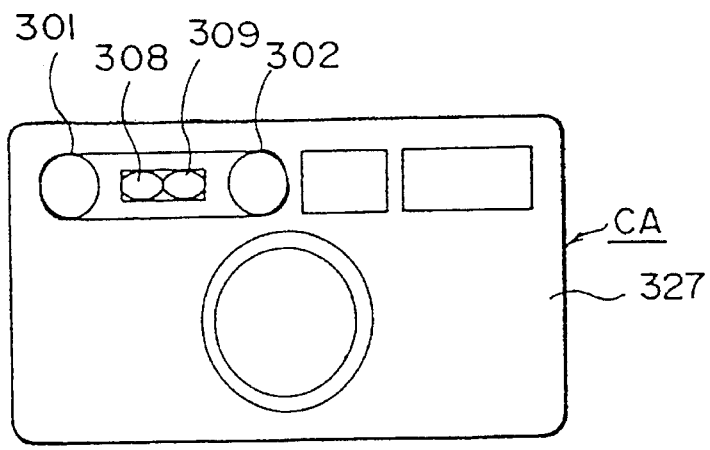
FIG. 10 is a drawing to show a whole camera.

FIG. 9 is a block diagram to show the distance measuring apparatus of camera constructed according to the present invention, in which the constituent elements are built in the camera CA. The arrows in the drawing represent transmission directions of signals. FIG. 10 is a drawing to show the whole of the camera.

Figure 11A:
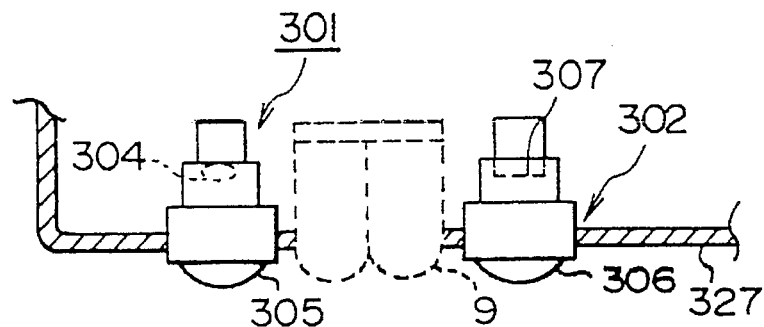
FIG. 11A is a plan view to show structure of a light-projecting portion and a light-receiving portion in an active distance measuring apparatus.
Figure 11B:
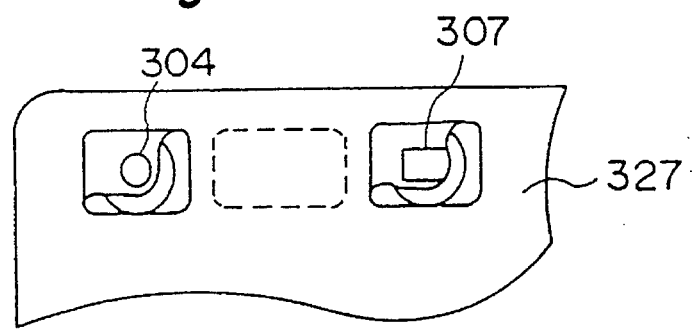
FIG. 11B is a front elevation of the part of FIG. 11A, partly in cross section.

First, the active distance measuring unit as the first distance measuring unit is composed of a light-projecting portion 301, a light-receiving portion 302, and a distance-measurement circuit 303. FIG. 11A is a plan view of the light-projecting portion 301 and light-receiving portion 302, and FIG. 11B a front elevation thereof, partly in cross section. LED 304 is set inside the light-projecting portion 301, and light emitted from LED 304 is projected through a projection lens 305 placed on the front surface of the light-projecting portion 1 toward the object (not shown). The light reflected by the object reaches a receiving lens 306 placed on the front surface of the light-receiving portion 302 to be focused on a light-receiving surface of PSD 307 as a light-receiving device set in the light-receiving portion 302. PSD 307 has a single light-receiving surface and outputs two current signals $I_1, I_2$ depending upon where the focused light impinges in the light-receiving surface of this PSD. The position where the light impinges is a function of $(I_1-I_2)/(I_1+I_2)$. Since the focused position on the PSD 307 differs depending upon the distance of the object from the camera, the distance to the object can be measured with an output from PSD 307, based on the so-called principle of trigonometry. The distance-measurement circuit 303 converts the output signal from PSD 307 into the distance to the object.

Figure 12A:
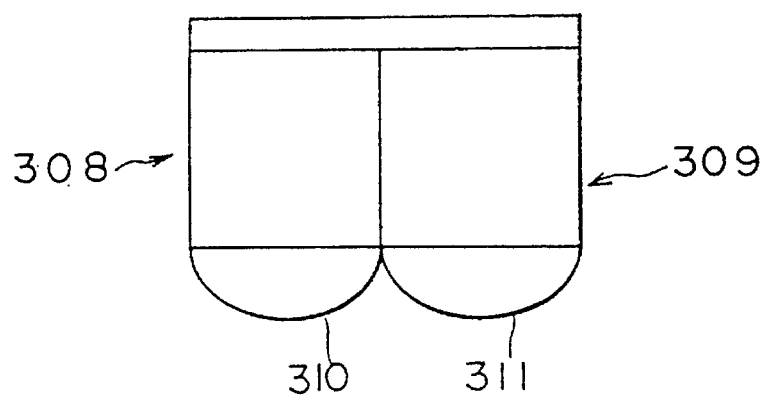
FIG. 12A is a plan view to show structure of a right light-receiving portion and a left light-receiving portion in a passive distance measuring apparatus.
Figure 12B:
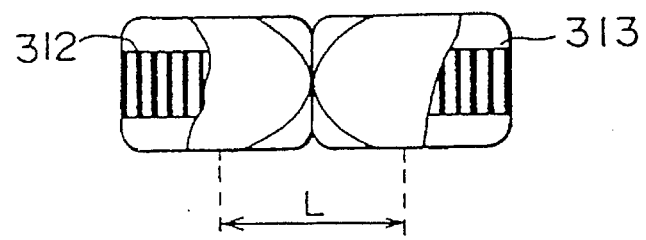
FIG. 12B is a front elevation of the part of FIG. 12A, partly in cross section.

Further, the passive distance measuring unit as the second distance measuring unit is composed of a right light-receiving portion 308, a left light-receiving portion 309, and a distance-measurement circuit 310. FIG. 12A is a plan view of the right light-receiving portion 308 and left light-receiving portion 309, and FIG. 12B a front elevation thereof, partly in cross section. The natural light reflected by the object and the background reaches receiving lenses 310, 311 placed on the front surfaces of the right light-receiving portion 308 and left light-receiving portion 309, respectively, to be focused on CCDs 312, 313 set in the right light-receiving portion 308 and left light-receiving portion 309. Each CCD 312, 313 is a pixel type light-receiving device having a plurality of light-receiving surfaces and outputting a plurality of signals (voltages), and an output from each CCD 312, 313 is a group or array of a plurality of analog signals in sequence. In FIG. 12B, each of stripe patterns shown on CCDs 312, 313 represents a pixel. CCD 312 receives reflected light incident at a certain entrance angle from the object while CCD 313 receives reflected light incident at an entrance angle slightly different therefrom from the same object. The difference between the entrance angles is caused by a difference of distance L (distance between the center lines) shown in FIG. 12B between mount positions of CCD 312 and CCD 313. Accordingly, the arrays of output signals from CCD 312 and CCD 313 have a phase difference corresponding to the difference between the entrance angles. The distance to the object can be measured based on the principle of trigonometry by calculating the difference between the entrance angles by the distance-measurement circuit 310, based on the phase difference and distance L.

Figure 13:
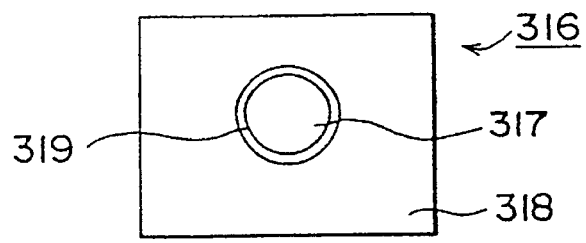
FIG. 13 is a cross-sectional view to show internal structure of a photodiode as a photometry apparatus.

Next, the photometry unit 314 for measuring the luminances of the object and the background is composed of a PD (photodiode) 316. FIG. 13 is a front elevation of PD 316. The surface on PD 316 is divided into two areas, a circular, central area 317 and a peripheral area 318 surrounding it, and there is an insulating area 319 between the two areas. A lens (not shown) is set in front of PD 316, so that the light from the object is mainly focused on the center area 317 and the light from the background mainly on the peripheral area 318. Thus, the luminances of the object and the background can be measured separately from each other from an output from the center area 317 and an output from the peripheral area 318. The output from the center area 317 and the output from the peripheral area 318 are put into the back-light determining unit 315. The back-light determining unit 315 determines that the taking light is back-light, based on these two outputs, when the luminance of the object is low whereas the luminance of the background is high.

Based on an output signal from the back-light determining unit 315, the distance-value selecting circuit 320 selects the output from the passive distance measuring unit as a distance value used in shooting with determination of back-light, while it selects the output from the active distance measuring unit as a distance value with determination of being not the back-light.

The reason why the output from the passive distance measuring unit is used when the taking light is back-light is as follows. The active distance measuring unit measures the distance to the object, based on signal light reflected by the object, and in the case of the back-light, the light such as the sun light etc. goes into the taking lens from behind the object to be taken, which makes detection of the signal light difficult. In other words, an output signal from the light-receiving device having a single light-receiving surface, such as PSD, becomes saturated because of a lot of light from the sun etc. in back-light situations, which disables detection of a less quantity of the signal light as compared with the lot of light. On the other hand, in the case of the passive distance measuring unit, because CCD is a pixel type light-receiving device outputting a plurality of signals, it is rare that all pixels become saturated even in the back-light situations, and the passive distance measurement can be performed when the taking light is back-light.

A reason why the output from the active distance measuring unit is used when the taking light is not back-light is that it is more advantageous to use the output from the active distance measuring unit which can measure the distance to the object with high accuracy because the detection of the signal light reflected by the object is easier when the taking light is not back-light. In contrast, if the taking light is not back-light, particularly when the luminance of external field is low, a quantity of the natural light reflected by the object is as low as below the measurement level of CCD, whereby use of the passive distance measuring method becomes impossible.

Figure 14:
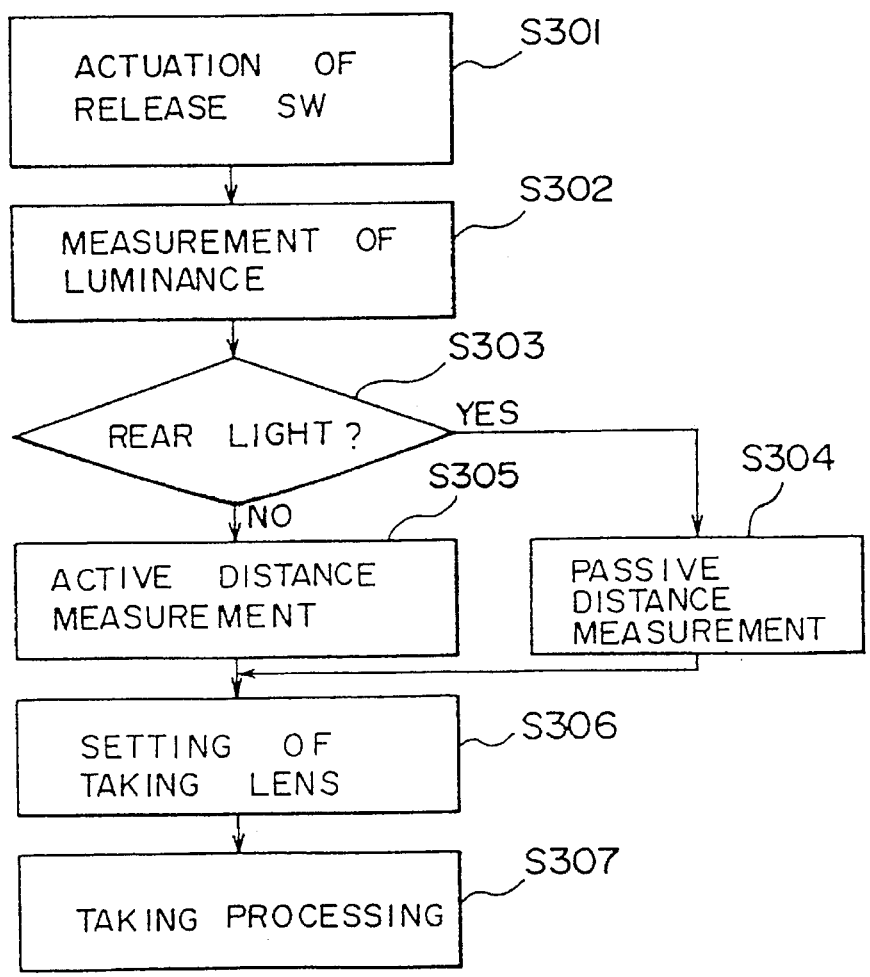
FIG. 14 is a flowchart to show a method for measuring a distance, according to the present invention.

The operation of the distance measuring apparatus of camera according to the present invention is next described referring to FIG. 14. First, when the release switch (not shown) is turned on (step S301), the luminances of the object and the background are measured by PD 316 as the photometry unit 314. Namely, the center region 317 of PD 316 outputs a signal corresponding to the luminance of the object while the peripheral region 318 outputs a signal corresponding to the luminance of the background (step S302). Next, the back-light determining device 315 determines that the taking light is back-light where the luminance of the background is higher than that of the object and where a difference between them is at least a predetermined value; but it determines that the taking light is not back-light for the other case (step S303). The passive distance measurement is carried out by the light-projecting portion 301, light-receiving portion 302, and distance-measurement circuit 303 with determination of back-light (step S304), and the active distance measurement is carried out by the right light-receiving portion 308, left light-receiving portion 309, and distance-measurement circuit 310 with determination of not being back-light (step S305). Then a taking distance of the taking lens is set based on this distance value (step S306), and subsequently, the taking processes are carried out (step S307).

According to the present invention, the distance measuring apparatus of camera comprises the first distance measuring unit having the light-receiving device with a single light-receiving surface, the second distance measuring unit having the pixel type light-receiving device with a plurality of light-receiving surfaces, the photometry unit for measuring the luminances of the object and the background, the back-light determining device for determining whether or not the taking light is back-light, and the selecting device for selecting a distance value used in shooting, whereby the distance to the object can be measured even if the taking light is back-light. Since the second distance measuring unit has the pixel type light-receiving device outputting a plurality of signals, it is rare that all pixels become saturated in back-light circumstances, so that the distance to the object can be measured even if the taking light is back-light.

The active distance measuring unit measures the distance to the object, based on the light reflected by the object. However, because there is a limit on arrival distance of light emitted from the light-projecting portion, the distance measurement becomes impossible by failure of detection of reflected light for far objects. In order to extend the arrival distance of the emitted light a great quantity of light is necessary, which requires an expensive light-emitting device and a large-scale optical system set on the front surface of the light-emitting device. These result in increases in costs and size of camera, and therefore, there is a spontaneous limit on the arrival distance of the light emitted from the light-projecting portion.

On the other hand, the passive distance measuring unit has a uniform accuracy of distance measurement in the range of near distances to far distances.

Thus, an object of the present invention is to provide a distance measuring apparatus of camera which is so arranged that the distance measurement of object is performed by the active distance measuring unit for relatively near objects while the distance measurement of object is performed by the passive distance measuring unit for relatively far objects.

The apparatus shown in FIG. 15 to FIG. 19 comprises an active distance measuring unit having a light-projecting portion for emitting light toward the object and a light-receiving portion for receiving the light reflected by the object and measuring the distance to the object by the principle of trigonometry based on a position of the reflected light on the light-receiving portion, a passive distance measuring unit having two light-receiving portions for receiving the light from the object and measuring the distance to the object by the principle of trigonometry based on a phase difference between output signals of these light-receiving portions, and a selecting device making the active distance measuring unit perform at least one distance measurement, selecting a distance value of the active distance measuring unit as a distance used in shooting when the distance value is smaller than a predetermined value, and selecting a distance value of the passive distance measuring unit as a distance used in shooting when the distance value of the active distance measuring unit is larger than the predetermined value.

In the present invention, the active distance measuring unit performs at least one distance measurement, the distance value of the active distance measuring unit is selected as a distance used in shooting when the distance value of the active distance measuring unit is smaller than the predetermined value, and the distance value of the passive distance measuring unit is selected as a distance used in shooting when the distance value of the active distance measuring unit is larger than the predetermined value. Accordingly, the apparatus can avoid such an event that the distance measurement of object cannot be done because of failure of arrival of the light from the light-projecting portion in the active distance measuring unit at the object located too far. If the object is located relatively near, the distance to the object can be measured accurately by the active distance measurement.

Figure 15:
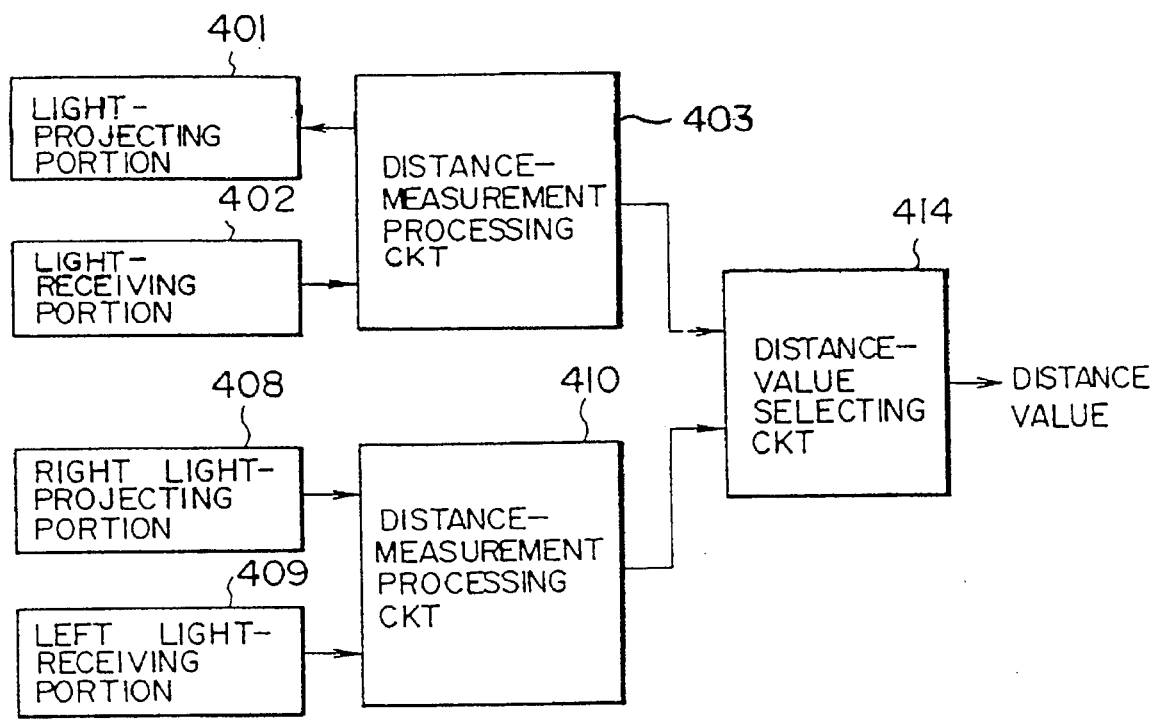
FIG. 15 is a block diagram to show structure of a distance measuring apparatus of camera constructed according to the present invention.
Figure 16:
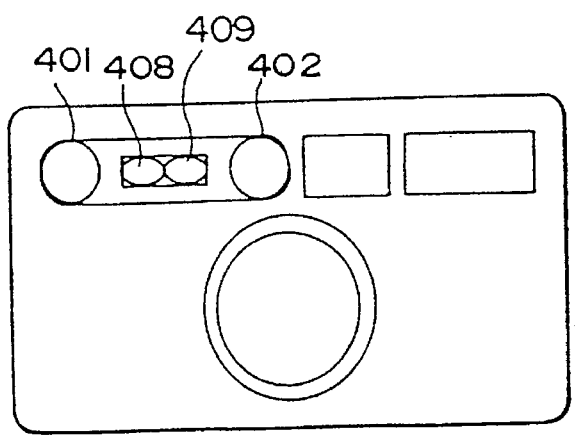
FIG. 16 is a drawing to show a whole camera.

FIG. 15 is a block diagram to show the distance measuring apparatus of camera constructed according to the present invention. The constituent elements are built in the camera and the arrows represent transmission directions of signals. FIG. 16 is a drawing to show the whole of the camera.

Figure 17A:
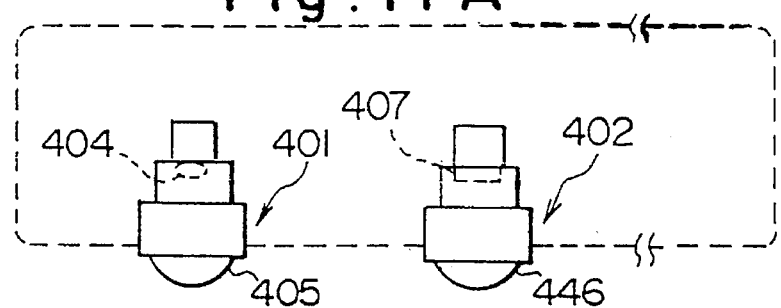
FIG. 17A is a plan view to show structure of a light-projecting portion and a light-receiving portion in an active distance measuring apparatus.
Figure 17B:
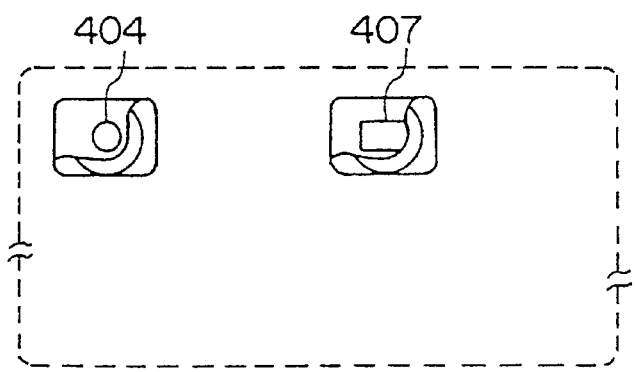
FIG. 17B is a front elevation of the part of FIG. 17A, partly in cross section.

First, the active distance measuring unit is composed of a light-projecting portion 401, a light-receiving portion 402, and a distance-measurement circuit 403. FIG. 17A is a plan view of the light-projecting portion 401 and light-receiving portion 402, and FIG. 17B a front elevation thereof, partly in cross section. LED 404 is set in the light-projecting portion 401, and light emitted from LED 404 travels through a projection lens 405 set on the front surface of the light-projecting portion 401 to reach an object (not shown). The light reflected by the object reaches a receiving lens 406 set on the front surface of the light-receiving portion 402 to be focused on a light-receiving surface of PSD 407 as a light-receiving device set in the light-receiving portion 402. Since the focused position on PSD 407 differs depending upon the distance of object from the camera, the distance to the object can be measured based on the so-called principle of trigonometry from an output from PSD 407. The distance-measurement circuit 403 converts the output from PSD 407 into the distance to object.

As described, the active distance measuring unit measures the distance to the object based on the light reflected by the object, but has a limit of arrival distance of the emitted light from LED 404. Therefore, the distance measurement will be impossible for far objects because of failure of detection of the reflected light.

Figure 18A:
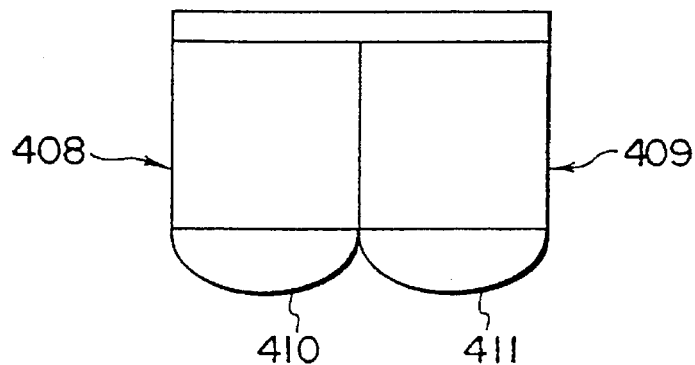
FIG. 18A is a plan view to show structure of a right light-receiving portion and a left light-receiving portion in a passive distance measuring apparatus.
Figure 18B:
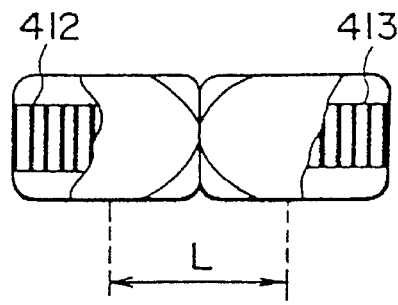
FIG. 18B is a front elevation of the part of FIG. 18A, partly in cross section.

On the other hand, the passive distance measuring unit is composed of a right light-receiving portion 408, a left light-receiving portion 409, and a distance-measurement circuit 410. FIG. 18A is a plan view of the right light-receiving portion 408 and left light-receiving portion 409, and FIG. 18B a front elevation thereof, partly in cross section. The natural light reflected by the object or the background reaches receiving lenses 410, 411 set on the front surfaces of right light-receiving portion 408 and left light-receiving portion 409, respectively, to be focused on CCDs 412, 413 set in the right light-receiving portion 408 and left light-receiving portion 409. Each CCD 412, 413 is a pixel type light-receiving device for outputting a plurality of signals (voltages) and an output from CCD 412, 413 is a group or array of plural analog signals in sequence. In FIG. 18B, each stripe pattern shown on the CCDs 412, 413 represents a pixel. CCD 412 receives the reflected light incident at a certain incident angle from the object, while CCD 413 receives reflected light incident at an incident angle slightly different from that of CCD 412 from the same object. A difference between the incident angles is caused by a difference of distance L (distance between the center lines) shown in FIG. 18B between mount positions of CCD 412 and CCD 413. Accordingly, the arrays of output signals from CCD 412 and CCD 413 will have a phase difference corresponding to the difference between the incident angles. Calculating the difference between the incident angles by the distance-measurement circuit 410 based on the phase difference and distance L, the distance to the object can be measured based on the principle of trigonometry.

As so arranged, the passive distance measuring unit can achieve a uniform accuracy of distance measurement in the range of from near distances to far distances. A result of distance measurement of the passive distance measuring unit depends upon the contrast of object, and it cannot perform distance measurement for objects with uniform luminance.

Next, the distance-value selecting circuit 414 is arranged to select a distance value used in shooting from the distance measurement result of the active distance measuring unit and the distance measurement result of the passive distance measuring unit. Which is selected is determined depending upon the distance to the object. For this purpose, the distance-value selecting circuit 414 first makes the active distance measuring unit perform only one distance measurement and from a result of the distance measurement, for example, the result of the passive distance measuring unit is selected for objects farther than 3 m while the result of the active distance measuring unit for objects nearer than 3 m. It is because there is a possibility that the light from LED 404 in the light-projecting portion 401 fails to reach the object farther than 3 m.

Figure 19:
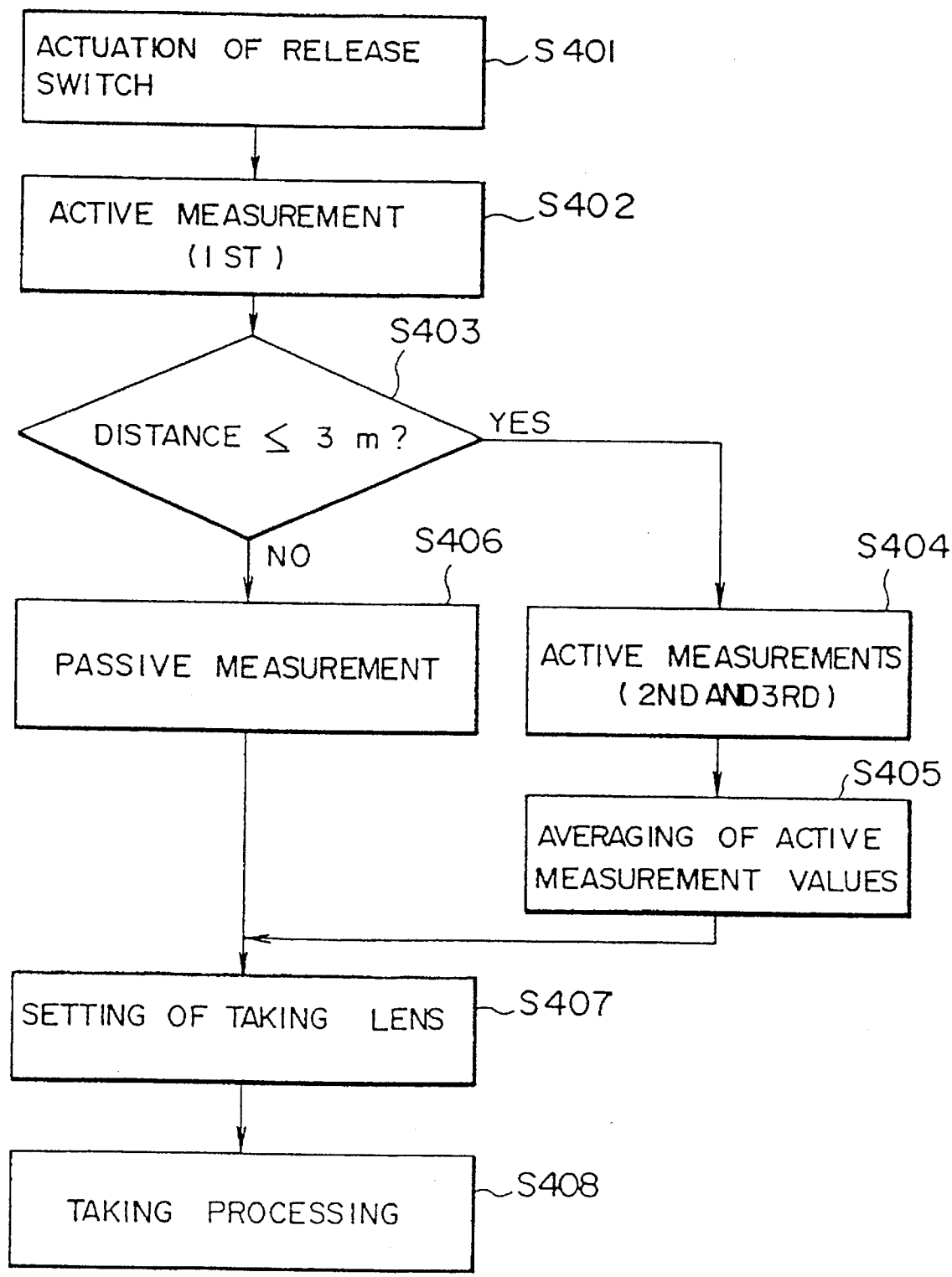
FIG. 19 is a flowchart to show a method for measuring a distance, according to the present invention.

The operation of the distance measuring apparatus of camera according to the present invention is next described referring to FIG. 19. First, when the release switch (not shown) is turned on (step S401), the distance-value selecting circuit 414 makes the active distance measuring unit measure the distance to the object (step S402). Although a single measurement is sufficient, an average of two or more measurements can enhance the distance measurement accuracy. Next, the distance-value selecting circuit 414 determines whether or not the distance to the object is shorter than 3 m (step S403). When it is determined that the distance is shorter than 3 m, the active distance measurement is further performed two more times (step S404), and an average is taken for the three distance values, the distance value at step S402 and the two distance values at step S404 (step S405). The average can enhance the accuracy of distance value. The distance measurement at step S404 may be done three or more times, whereby the accuracy can be enhanced by the number of times, but the time is consumed thereby.

On the other hand, when step S403 finds that the distance is not less than 3 m, that is, that the object is located at a position over 3 m, the passive distance measurement is carried out by the passive distance measuring unit (step S406). Since a uniform accuracy of distance measurement can be achieved by the passive distance measurement in the range of from near distances to far distances, the distance measurement can be performed at the same accuracy even for far objects as for near objects. Then a shooting distance of the taking lens is set based on the distance value obtained at step S405 or step S406 (step S407), and subsequently, the taking processes are carried out (step S408).

As described above, the present invention can provide the distance measuring apparatus of camera comprising the active distance measuring unit having the light-projecting portion for emitting light toward the object and the light-receiving portion for receiving the light reflected by the object, and measuring the distance to the object by the principle of trigonometry based on a position of reflected light on the light-receiving portion, the passive distance measuring unit having the two light-receiving portions for receiving the light from the object and measuring the distance to the object by the principle of trigonometry based on a phase difference between output signals from these light-receiving portions, and the selecting device making the active distance measuring unit perform at least one distance measurement, selecting the distance value of the active distance measuring unit as a distance used in shooting when the distance value is smaller than the predetermined value, and selecting the distance value of the passive distance measuring unit as a distance used in shooting when the distance value is larger than the predetermined value, whereby the apparatus can avoid such an event that the distance to the object cannot be measured because of failure of arrival of the light from the light-projecting portion in the active distance measuring unit at the object located too far, and whereby the distance to the object can be measured accurately by the active distance measurement for relatively near objects. Japanese Patent Applications No. 315431, No. 315441, No. 315458, and No. 315461, filed in Japan Dec. 15, 1993 and being the bases of the present application, are incorporated herein by reference.

What is claimed is:

1. An apparatus for measuring a distance to an object, comprising:
   (a) a first processing unit for calculating the distance to said object, based on an input signal;
   (b) a second processing unit for calculating the distance to said object, based on an input signal;
   (c) a first distance measuring unit of an active method for projecting first light toward said object in order to calculate the distance to the object by said first processing unit and detecting said first light reflected by said object to output a signal detected to said first processing unit;
   (d) a second distance measuring unit of a passive method for detecting two light beams from said object, having passed through mutually different paths, in order to calculate the distance to the object by said second processing unit and outputting a signal detected to said second processing unit;
   (e) a semiconductor photodetector comprising a first photodetecting region, a second photodetecting region surrounding said first photodetecting region, and an insulator located between said first photodetecting region and said second photodetecting region;
   (f) an optical system arranged so that light from said object is incident to said first photodetecting region and so that light from the surroundings of said object is incident to said second photodetecting region;
   (g) a comparator into which an output signal from said first photodetecting region and an output signal from said second photodetecting region are put; and
   (h) a selecting circuit into which a first output signal from said first processing unit and a second output signal from said second processing unit are put and which outputs said first output signal or said second output signal depending upon an output from said comparator.

2. An apparatus according to claim 1, wherein said selecting circuit outputs said second output signal when the output from said second photodetecting region is greater than the output from said first photodetecting region, and wherein said selecting circuit outputs said first output signal when the output from said second photodetecting region is smaller than the output from said first photodetecting region.

3. An apparatus according to claim 1, further comprising:
(i) a case for housing said first and second processing units;
(j) a lens for taking said object;
(k) a lens moving mechanism mounted to said case, for moving said lens relative to said case;
(l) a motor for driving said lens moving mechanism;
(m) a release button mounted to the case; and
(n) a controller into which said first output signal or said second output signal from said selecting circuit is put when said release button is depressed and which controls the motor in accordance with an input signal to move said lens to a position where an image of said object is focused on a film set in the case.

4. An apparatus according to claim 1,
wherein said first distance measuring unit comprises a light-emitting device for emitting said first light and a first light-receiving device for receiving said first light; and
wherein said second distance measuring unit comprises second light-receiving devices for receiving the two light beams from the object, having passed through said mutually different paths.

5. An apparatus according to claim 3, further comprising a temperature sensor connected to said controller.

6. An apparatus according to claim 4, wherein said light-emitting device is a light-emitting diode, said first light-receiving device is a position-detection-type semiconductor device, and said second light-receiving devices are charge coupled devices.

7. An apparatus according to claim 4, wherein said second light-receiving devices are located between said light-emitting device and said first light-receiving device.

8. An apparatus according to claim 1, further comprising:
(i) a case for housing said first and second processing units;
(j) a lens for taking said object;
(k) a lens moving mechanism mounted to said case, for moving said lens relative to said case;
(l) a motor for driving said lens moving mechanism;
(m) a release button mounted to the case;
(n) a shutter mechanism set in said case; and
(o) a controller into which said first output signal or said second output signal from said selecting circuit is put when said release button is depressed at a first time and which controls said motor in accordance with an input signal to move said lens to a position where an image of said object is focused on a film set in said case, said controller controlling said shutter mechanism when said release button is depressed at a second time after said first time.

9. A method for measuring a distance from an apparatus to an object, comprising:
(a) projecting first light toward said object and detecting said first light reflected by said object to calculate a distance to said object so as to obtain the distance to said object;
(b) detecting two light beams from said object, having passed through mutually different paths, to calculate the distance to said object so as to obtain the distance to said object; and
(c) detecting a temperature of said apparatus, selecting a value obtained at said step (b) when said temperature is within a first range, and selecting a value obtained at said step (a) when said temperature is out of said first range, thereby accurately measuring the distance to said object.

10. A method according to claim 9, wherein a lens set between said object and a film is moved so that an image of said object is focused on said film, based on a value selected at said step (c).

* * * * *